(12) United States Patent
Corfitsen

(10) Patent No.: US 9,352,728 B2
(45) Date of Patent: May 31, 2016

(54) DEVICE AND METHOD FOR REPLACEMENT OF BATTERIES IN BATTERY DRIVEN VEHICLES

(71) Applicant: Sten Corfitsen, Stockholm (SE)

(72) Inventor: Sten Corfitsen, Stockholm (SE)

( * ) Notice: Subject to any disclaimer, the term of this patent is extended or adjusted under 35 U.S.C. 154(b) by 28 days.

(21) Appl. No.: 14/395,197

(22) PCT Filed: Apr. 17, 2013

(86) PCT No.: PCT/SE2013/050421
§ 371 (c)(1),
(2) Date: Oct. 17, 2014

(87) PCT Pub. No.: WO2013/158026
PCT Pub. Date: Oct. 24, 2013

(65) Prior Publication Data
US 2015/0129337 A1 May 14, 2015

(30) Foreign Application Priority Data

Apr. 18, 2012 (SE) ........................................ 1250388

(51) Int. Cl.
  *B60S 5/06* (2006.01)
  *B60L 11/18* (2006.01)
  *B60K 1/04* (2006.01)

(52) U.S. Cl.
CPC ... *B60S 5/06* (2013.01); *B60K 1/04* (2013.01); *B60L 11/1822* (2013.01); *B60L 11/1877* (2013.01); *B60K 2001/0472* (2013.01);
(Continued)

(58) Field of Classification Search
CPC ......................................................... B60S 5/06

USPC ............................................................ 180/68.5
See application file for complete search history.

(56) References Cited

U.S. PATENT DOCUMENTS

| 3,477,538 | A | * | 11/1969 | Hall ...................... B60K 1/04 105/51 |
| 3,838,745 | A | * | 10/1974 | Kappei ................. B60K 1/04 104/34 |

(Continued)

FOREIGN PATENT DOCUMENTS

| DE | 10 2010 018 698 | 11/2011 |
| EP | 2 231 447 B1 | 9/2010 |

(Continued)

OTHER PUBLICATIONS

International Search Report, dated Aug. 14, 2013, from corresponding PCT application.

*Primary Examiner* — Jeffrey J Restifo
(74) *Attorney, Agent, or Firm* — Young & Thompson

(57) ABSTRACT

Method for battery replacement in a vehicle (110), which vehicle is equipped with a storage space (150;200;300;400) for a battery (120,122;220;320;420;620), where an opening (151;204;304;404) into the storage space exists under the vehicle, wherein the vehicle assumes a first and a second predetermined position in relation to first and second battery transport devices (130;140) that bring a battery out from the vehicle and a battery into the vehicle. The transport devices are installed at least partly above ground (100) and beside the positions, and in that the batteries are brought along a respective path (121,123) running from the storage space, under a side beam (112) of the vehicle and up to a respective position above ground and beside the vehicle. A device for automatic battery replacement and a storage device for use in a vehicle are also described.

20 Claims, 9 Drawing Sheets

(52) U.S. Cl.
CPC .......... *B60L2200/18* (2013.01); *B60L 2200/36* (2013.01); *Y02T 10/705* (2013.01); *Y02T 10/7005* (2013.01); *Y02T 10/7072* (2013.01); *Y02T 90/124* (2013.01); *Y02T 90/14* (2013.01); *Y10T 29/49108* (2015.01); *Y10T 29/53135* (2015.01)

(56) References Cited

U.S. PATENT DOCUMENTS

| | | | | | |
|---|---|---|---|---|---|
| 4,102,273 | A | * | 7/1978 | Merkle | B60K 1/04 104/34 |
| 4,450,400 | A | * | 5/1984 | Gwyn | B60K 1/04 104/34 |
| 5,301,765 | A | * | 4/1994 | Swanson | B60K 1/04 104/34 |
| 5,373,910 | A | * | 12/1994 | Nixon | B60K 1/04 104/34 |
| 5,542,488 | A | * | 8/1996 | Nixon | B60K 1/04 104/34 |
| 5,549,443 | A | * | 8/1996 | Hammerslag | B60K 1/04 104/34 |
| 5,612,606 | A | * | 3/1997 | Guimarin | B60K 1/04 104/34 |
| 5,711,648 | A | * | 1/1998 | Hammerslag | B60K 1/04 104/34 |
| 5,760,569 | A | * | 6/1998 | Chase, Jr. | B60K 1/04 104/34 |
| 5,820,331 | A | * | 10/1998 | Odell | B60K 1/04 180/68.5 |
| 5,879,125 | A | * | 3/1999 | Odell | B60K 1/04 104/34 |
| 5,927,938 | A | * | 7/1999 | Hammerslag | B60K 1/04 180/68.5 |
| 5,998,963 | A | * | 12/1999 | Aarseth | B60K 1/04 104/34 |
| 6,213,025 | B1 | * | 4/2001 | Sauerwein | B65G 1/0414 104/121 |
| 6,631,775 | B1 | * | 10/2003 | Chaney | B60K 1/04 180/65.1 |
| 7,201,384 | B2 | * | 4/2007 | Chaney | B60K 1/04 180/68.5 |
| 7,712,563 | B2 | * | 5/2010 | Niebuhr | B60K 1/04 180/311 |
| 7,828,099 | B2 | * | 11/2010 | Heckeroth | B60K 1/00 180/2.2 |
| 7,993,155 | B2 | * | 8/2011 | Heichal | B60K 1/04 180/65.1 |
| 8,006,793 | B2 | * | 8/2011 | Heichal | B60K 1/04 180/65.1 |
| 8,146,694 | B2 | * | 4/2012 | Hamidi | B60K 1/04 180/68.5 |
| 8,516,687 | B2 | * | 8/2013 | Hozumi | B60L 11/1822 187/218 |
| 8,517,131 | B2 | * | 8/2013 | Kovach | H01M 2/1083 180/68.5 |
| 8,973,254 | B2 | * | 3/2015 | Droste | B60L 11/1877 29/730 |
| 9,162,654 | B2 | * | 10/2015 | Moller | B60K 1/04 |
| 9,187,004 | B1 | * | 11/2015 | Davis | B60L 11/1822 |
| 2005/0036861 | A1 | * | 2/2005 | Buchmann | B66F 9/0754 414/398 |
| 2005/0121241 | A1 | * | 6/2005 | Shorney | B60L 11/1822 180/68.5 |
| 2007/0012496 | A1 | * | 1/2007 | Chene | B60K 1/04 180/68.5 |
| 2008/0006459 | A1 | * | 1/2008 | Niebuhr | B60K 1/04 180/68.5 |
| 2009/0223724 | A1 | * | 9/2009 | Heckeroth | B60K 1/00 180/2.2 |
| 2010/0181129 | A1 | * | 7/2010 | Hamidi | B60K 1/04 180/68.5 |
| 2013/0104361 | A1 | * | 5/2013 | Corfitsen | B60L 11/1822 29/402.08 |
| 2014/0196966 | A1 | * | 7/2014 | Ohgitani | B60K 1/04 180/68.5 |
| 2015/0114736 | A1 | * | 4/2015 | Avganim | B60L 11/1822 180/68.5 |
| 2015/0129337 | A1 | * | 5/2015 | Corfitsen | B60L 11/1822 180/68.5 |

FOREIGN PATENT DOCUMENTS

| | | |
|---|---|---|
| EP | 2 340 951 A2 | 7/2011 |
| FR | 2 946 938 | 12/2010 |
| FR | 2 954 740 A | 7/2011 |
| GB | 2 027 653 A | 2/1980 |
| SE | 105 065 6 A1 | 12/2011 |

\* cited by examiner

DEVICE AND METHOD FOR REPLACEMENT OF BATTERIES IN BATTERY DRIVEN VEHICLES

The present invention relates to a method for replacing one or several batteries in a battery powered vehicle, as well as a device for receiving and accommodating such a battery in a vehicle and an automatic device for performing such a battery replacement.

There is previously known a system for replacement of electrical batteries for cars, for instance from EP 2231447 B1. In such systems, a device under the car is advanced, after the car has been taken up on a ramp similar to those used for inspection pits, and a discharged battery is replaced for a new one from below. This solution requires that the battery replacement device is buried into the ground and/or that the car is raised up, which is a considerable disadvantage since such an installation, apart from being expensive, also requires much space and therefore is difficult to integrate into an existing infrastructure such as petrol stations. Moreover, it is difficult to arrange such equipment outdoors, in particular in open air, because of problems with soiling and the like.

Furthermore, EP 2340951 A2 describes a device for receiving and accommodating a battery in a vehicle, which battery is inserted into the vehicle from below and vertically upwards. This device can be used together with a system such as the one described in EP 2231447 B1, above.

It is also known, from SE 1050656 A1, to replace batteries in vehicles by inserting and removing, respectively, batteries through a vertically arranged door in the vertical side of the car. Such solutions imply that the side of the car must be adapted to accommodate such a door, which often leads to large and therefore costly design modifications. Moreover, modern cars comprise relatively complicated side beam constructions in order to meet high demands with respect to weight, space use and crash safety. In case a battery is to be inserted through the side of the car, it is often necessary to alter the design of such side beams, which is not only expensive but which generally and all other things being equal leads to deteriorated crash safety.

The present invention solves the above described problems.

Hence, the present invention relates to a method for battery replacement in a vehicle, which vehicle is equipped with a storage space for a battery, wherein an opening into the storage space is arranged under the vehicle, wherein a battery installed in the storage space is arranged to be used to propel the vehicle, wherein the following steps are performed: a) the vehicle is caused to assume a first predetermined position in relation to a first transport device for automatic transport of a first battery out and away from the vehicle; b) the first transport device is caused to bring the first battery out and away from the vehicle; c) the vehicle is caused to assume a second predetermined position, which may be the same as the first predetermined position, in relation to a second transport device, which may be the same as the first transport device, for automatic transport of a second battery up to and into the vehicle; and d) the second transport device is caused to bring the second battery up to and into the vehicle; and is characterised in that the first and the second transport device are caused to be installed at least partially above ground and beside the first and second predetermined positions, respectively, and in that the first and second batteries are removed from and brought up to, respectively, the vehicle along a respective path which runs from the storage space, under a side beam of the vehicle and up to a respective position above ground and beside the vehicle.

Furthermore, the invention relates to a device for automatic battery replacement in a vehicle equipped with a storage space for a battery, wherein an opening to the storage space is arranged under the vehicle, and wherein a battery installed in the storage space is arranged to be used to propel the vehicle, which device is arranged to, after the vehicle has assumed a first predetermined position in relation to the device, bring a first battery out and away from the vehicle, and to, after the vehicle has assumed a second predetermined position, which may be the same as the first predetermined position, in relation to the device, bring a second battery up to and into the vehicle, which device is characterised in that the device is arranged to be installed at least partially above ground and beside the first and second, respectively, predetermined position, and in that the device is arranged to bring the first and second batteries away from and up to, respectively, the vehicle along a respective path which runs from the storage space, under a side beam of the vehicle and up to a respective position above ground and beside the vehicle.

Finally, the invention relates to a storage device in a vehicle arranged to receive and accommodate a battery, which when installed in a storage space comprised in the storage device is arranged to be used to propel the vehicle, wherein the storage device comprises a hinged door arranged at the underside of the vehicle, in that the door is arranged to be opened downwards and to, in its closed position, cover the said opening, and in that an upper support surface of the door is arranged to at least partially support the battery when the door is in its open position.

In the following, the invention will be described in detail, with reference to exemplifying embodiments of the invention and to the enclosed drawings, wherein:

FIGS. 1a and 1c are respective perspective outline diagrams of a vehicle in two different respective positions;

FIGS. 1b and 1d correspond to FIGS. 1a and 1c, respectively, but with a respective cross-section removed;

Figure 1A:
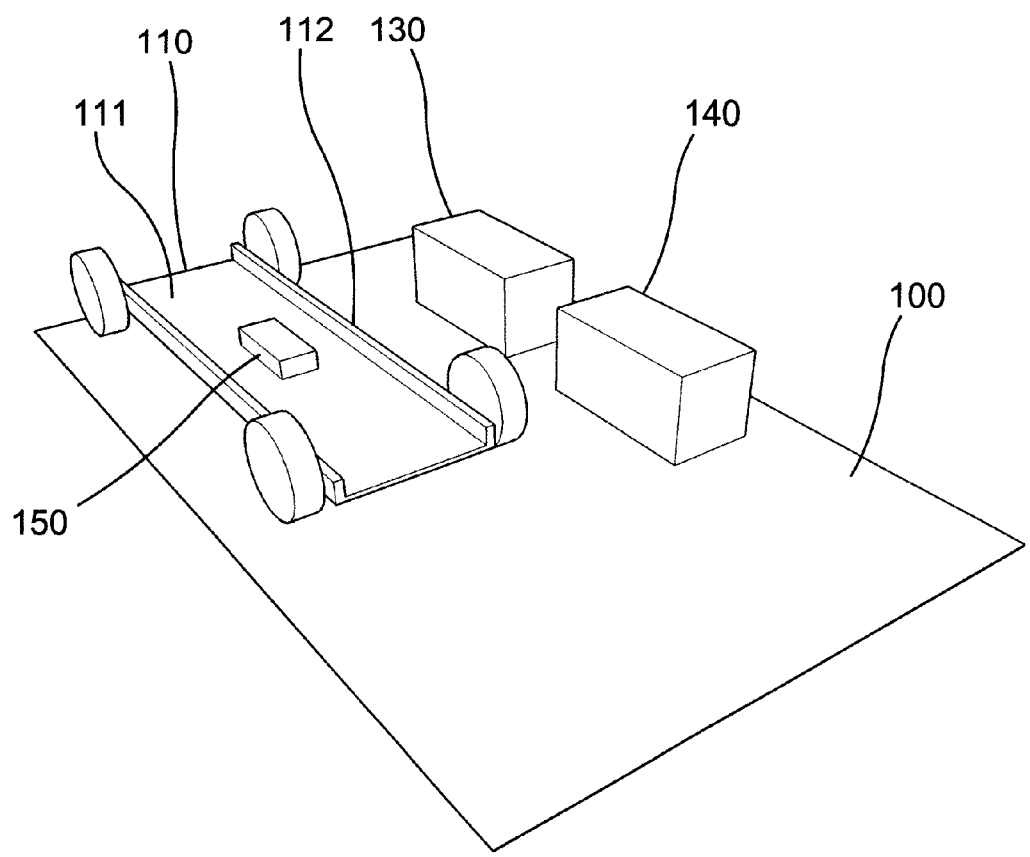
Figure 1B:
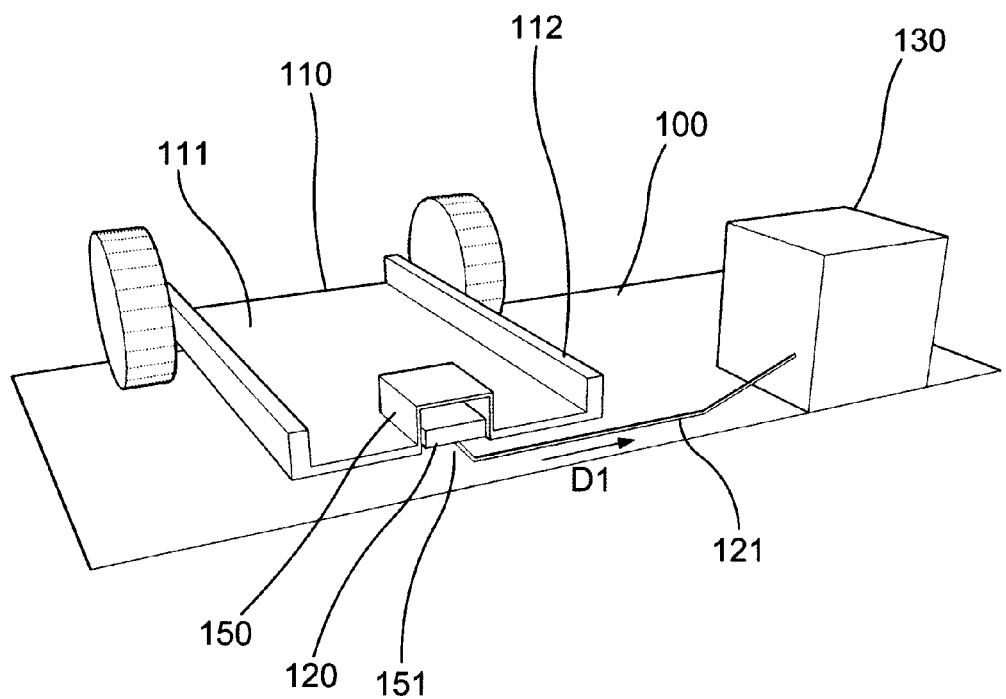
Figure 1C:
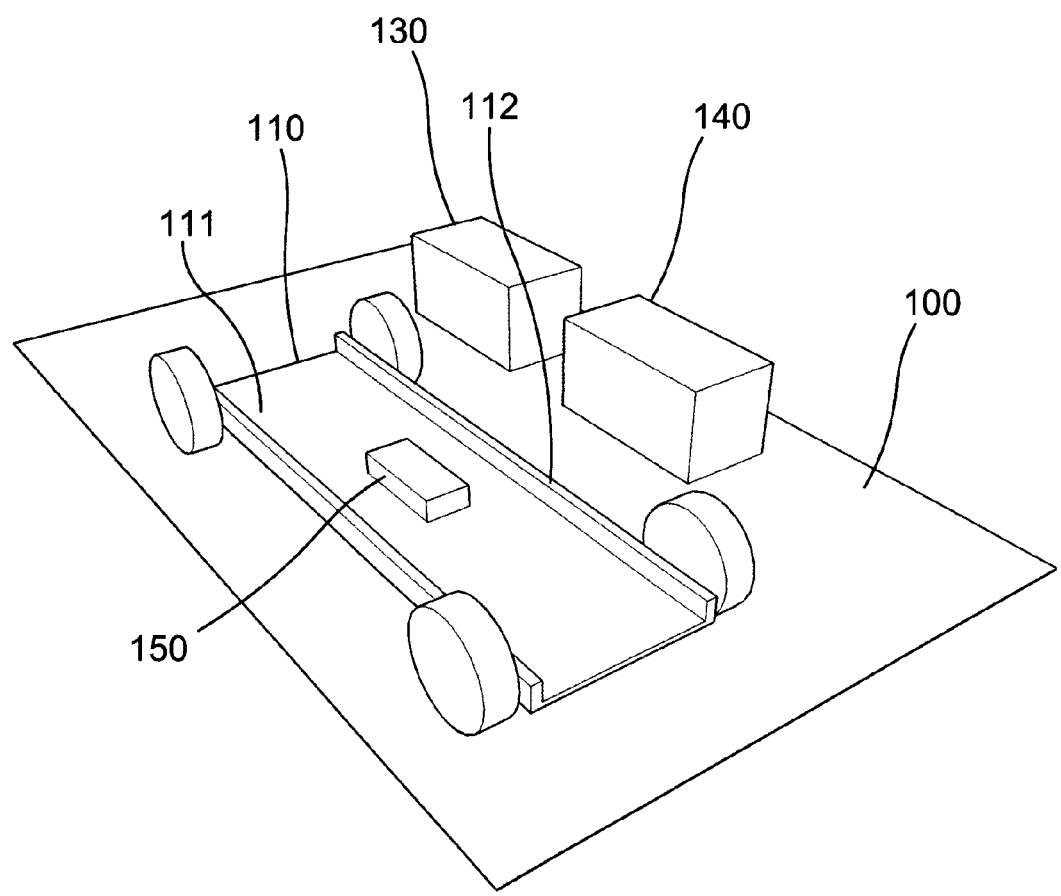

FIGS. 1a and 1c share the same reference numerals for corresponding parts. The same is true regarding FIGS. 2a-2c; FIGS. 3a-3b as well as FIGS. 4a-4b.

FIGS. 1a and 1c show a vehicle 110 in a first predetermined position in relation to a first transport device 130 for automatic transport of a first battery 120 out and away from the vehicle 110.

Figure 1D:
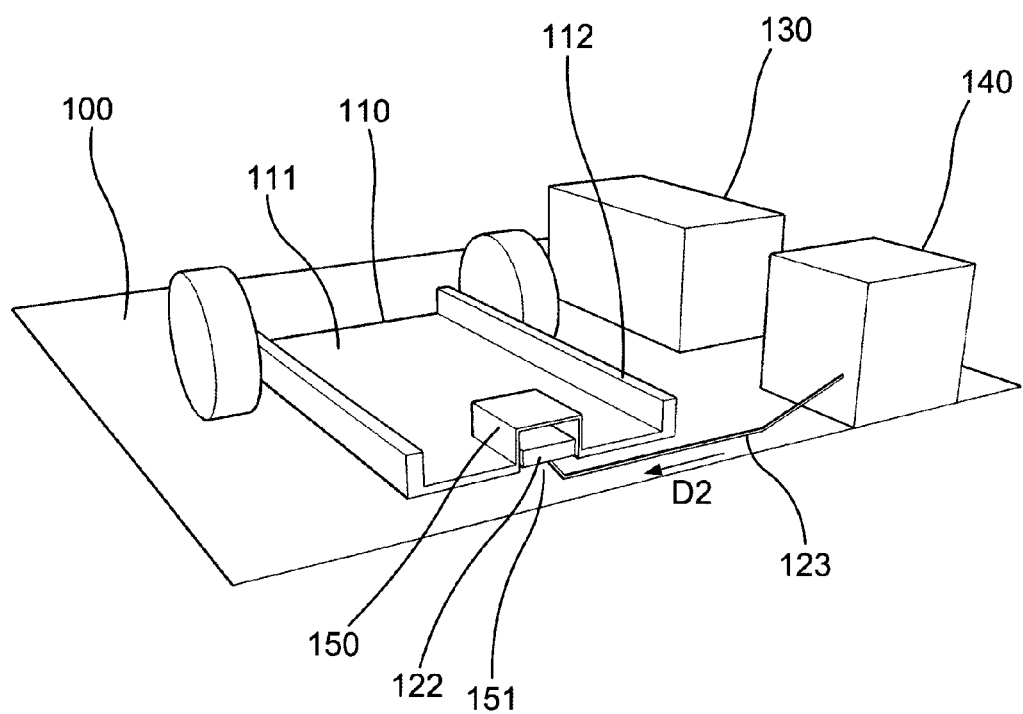

FIGS. 1b and 1d show, in a similar manner, the vehicle 110 in a second predetermined position in relation to a second transport device 140 for automatic transport of a second battery 122 up to and into the vehicle 110. Hence, in the second position the vehicle 110 has been driven forward somewhat in relation to the first position.

In FIGS. 1a and 1c, respectively 1b and 1d, the two positions are shown as different positions, and the devices 130, 140 as different distinct devices. However, it is realized that the positions can be one and the same, meaning that the vehicle 110 does not have to be displaced additionally in order to assume the second position once it has assumed the first position. It is also realized that the devices 130 and 140 in this and other cases may be one and the same device for battery transport.

It is also realized that both respective positions may be approximate, in the sense that the vehicle can be positioned within a certain interval about the respective predetermined position, after which the devices 130, 140 themselves can compensate for positioning inaccuracy of the vehicle within the said interval. Such compensation can for instance be accomplished using localization- and positioning devices which are known as such, such as positioning based upon a visual image of the vehicle which is processed using an algorithm for computer vision, alternatively a piece of laser scanning equipment. For instance, the vehicle may be equipped with a fixed point in the form of a predetermined marker, suitably with high contrast, for localization. It is preferred that an acknowledgement, for instance from such localization equipment, of that the vehicle is located in an acceptable position, is awaited before a battery is removed from and/or inserted into the vehicle in question.

The vehicle 110 is equipped with a storage space 150 for the battery 120, 122, where an opening 151 into the storage space 150 is arranged under the vehicle 110. It is preferred that the opening 151 is constituted by a hole in a bottom plate 111 of the vehicle 110.

The vehicle 110 is at least partially electrically driven, which means that a battery which is installed in the storage space 150 is arranged to be used to propel the vehicle. Suitable vehicles comprise electrical vehicles such as cars, trucks and buses, but also vehicles with so-called hybrid propulsion, where a part of the energy for driving the vehicle forward is taken from a fuel.

When a battery 120, which is installed in the storage space 150, is at least partly discharged, a user of the vehicle 110 chooses to go to a station for replacement of the battery 120. The station preferably comprises the devices 130, 140.

After the vehicles 110 have been caused to assume the first predetermined position, the first transport device 130 is arranged to bring the at least partly discharged battery 120 out through the opening 151, out and away from the vehicle 110, along a path 121 (see FIG. 1b) in a direction D1.

After the vehicle 110 thereafter has been caused to assume the second predetermined position, the second transport device 140 is arranged to bring the second battery 122, which battery preferably is fully charged but is at least more fully charged than the battery 120, up to and into the vehicle 110, along a path 123 (see FIG. 1d) in a direction D2.

According to the invention, both the first 130 and the second 140 transport device are installed at least partly, preferably completely, above ground 100, and beside the first and the second predetermined position, respectively, which the vehicle 110 assumes. Herein, that the devices 130, 140 are arranged "above ground" and "beside the position" is to be interpreted so that the devices 130, 140 are installed in such a way so that they act in relation to the vehicle 110 primarily from a position located at a side of the vehicle 110, preferably at a substantially horizontal distance from the vehicle.

Moreover, the two paths 121, 123 run from the storage space 150, under a side beam 112 of the vehicle 110 and on to a respective position above ground and beside the vehicle 110. The paths 121, 123 preferably run in a partly downwards directed motion from the storage space 150, so that the respective path 121, 123 passes the side beam 112 on its underside. Thereafter, it is preferred that the respective path 121, 123 runs essentially horizontally out from below the vehicle 110 and away towards the location to which the battery 120, 122 is to be taken or from which it has been brought.

Since the battery 120, 122 is taken out from the opening 151 under the vehicle 110, under the side beam 112 and away from the vehicle 110 above ground, the transport device or devices 130, 140 can also be installed above ground, and there is no need for structures buried into the ground, that makes the installation within the scope of existing infrastructure more difficult. Rather, the devices 130, 140 can be installed beside for instance a normal driving lane at an existing petrol station, whereby the predetermined positions for the vehicle 110 imply that the vehicle 110 is stopped in a suitable position in the said driving lane.

Furthermore, the side of the vehicle 110, in particular its often complex side beam construction, does not have to be adapted to any larger extent in order to accommodate a door or the like in the side of the vehicle 110 for replacing a battery.

The devices 130, 140 can themselves have a design similar to the embodiment described in SE 1050656 A1 for such transport devices, including a suitable horizontal transport plane and engagement means arranged to cooperate with a battery, for instance comprising suction cups.

The storage space 150 is hence preferably arranged at the underside of the vehicle 110, preferably at and in connection to a bottom plate 111 of the vehicle 110. Furthermore, the space 150 is preferably completely closed except for the opening 151, which leads out below the underside of the vehicle 110, preferably through the bottom plate 111, whereby the opening preferably is arranged essentially in line with the underside of the vehicle 110 and at a distance from all side beams 112 of the vehicle. Such a construction is simple and has minimal negative impact on the rest of the construction of the vehicle, aesthetics, road manners and crash safety. Moreover, the internal environment of the vehicle 110 is unaffected by the external environment, since the space 150 is separated from the interior of the vehicle 110. Hence, it is preferred that the space 150 is essentially liquid tight to the interior of the interior of the vehicle 110.

Furthermore, it is preferred that, in a first step, an existing, preferably non-electrically propelled car is converted to be electrically propelled, by creating such a hole 151 in the bottom plate of the car and to fasten, for instance by welding, such a storage space 150 in connection to the hole 151.

It is realized that the space 150 also can comprise leadthroughs for electrical cables and the like, that may as such be arranged in a tight-sealing manner.

Figure 2A:
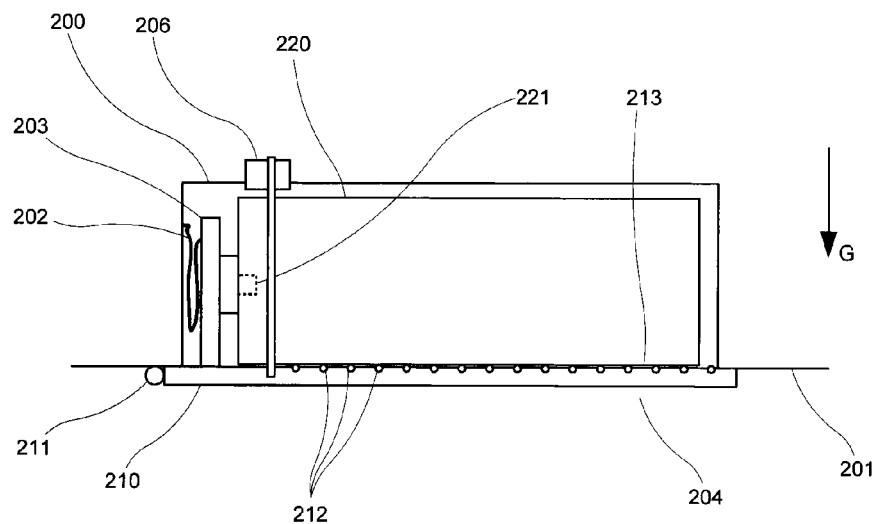
FIGS. 2a-2c show three outline diagrams in cross-section of a battery which in three respective steps is brought out from a storage space in a vehicle.
Figure 2B:
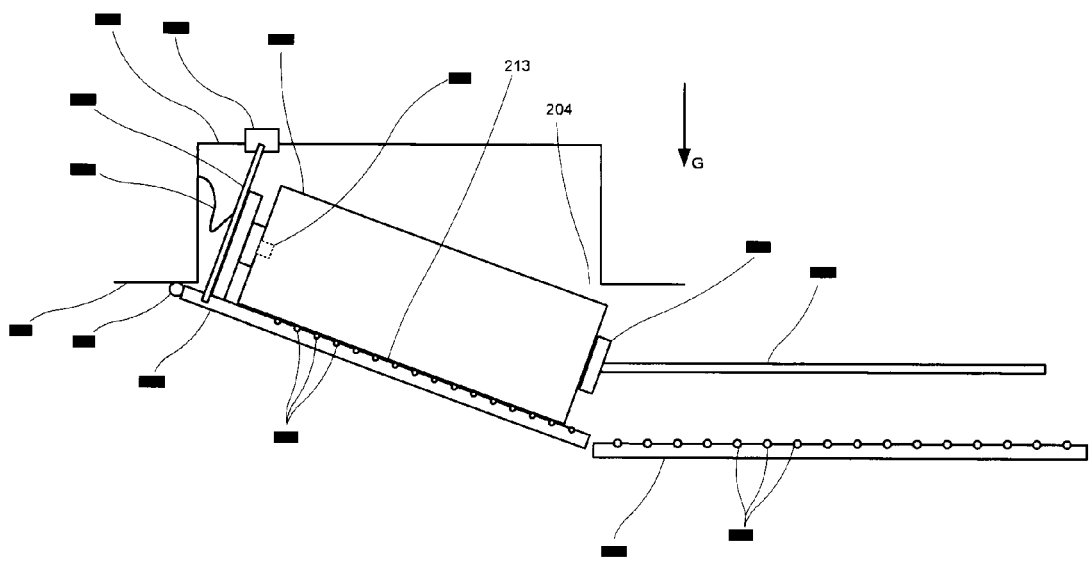
Figure 2C:
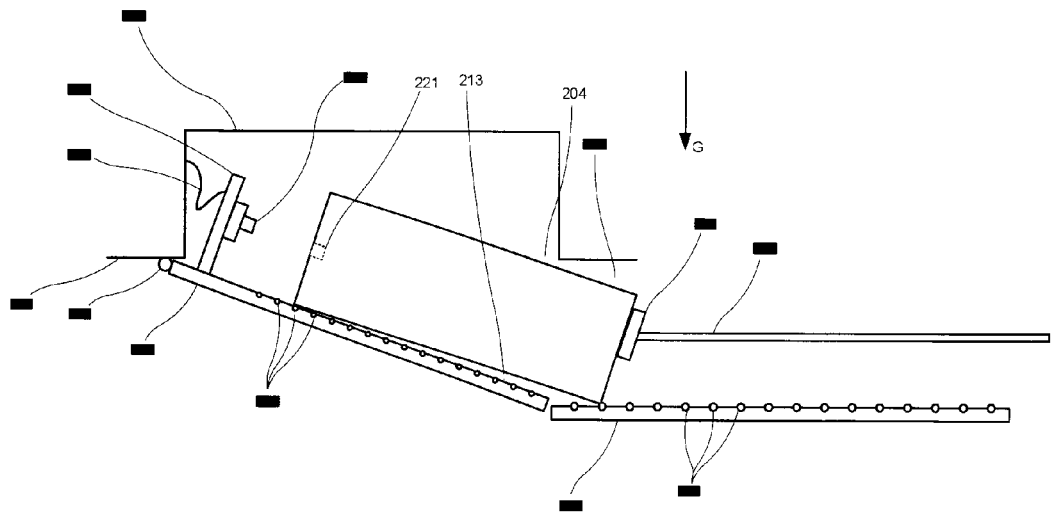
Figure 3A:
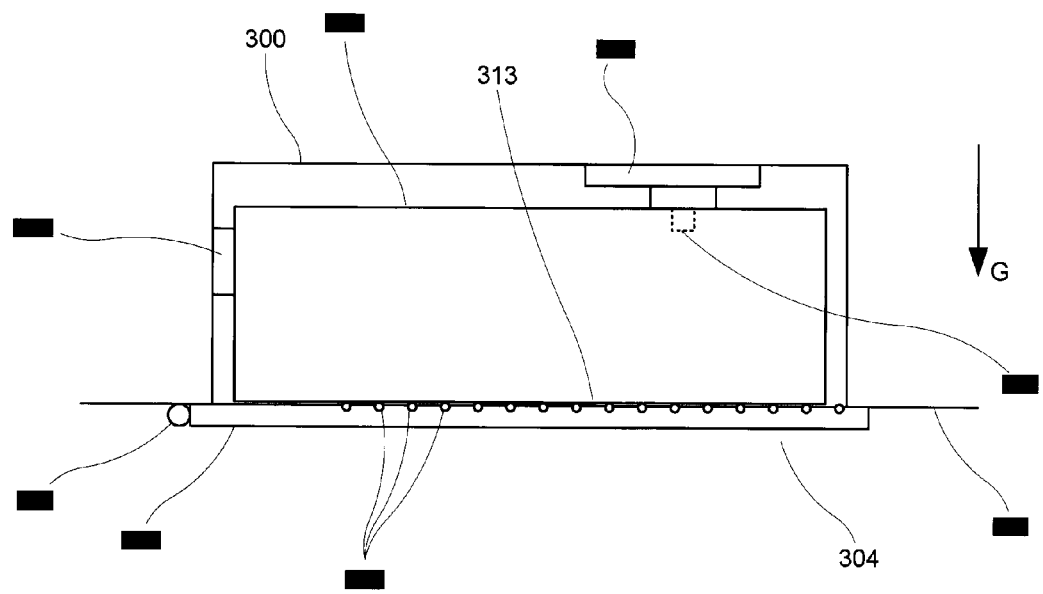
FIGS. 3a and 3b show two outline diagrams in cross-section of a battery which in two respective steps is brought out from a storage space in a vehicle.
Figure 3B:
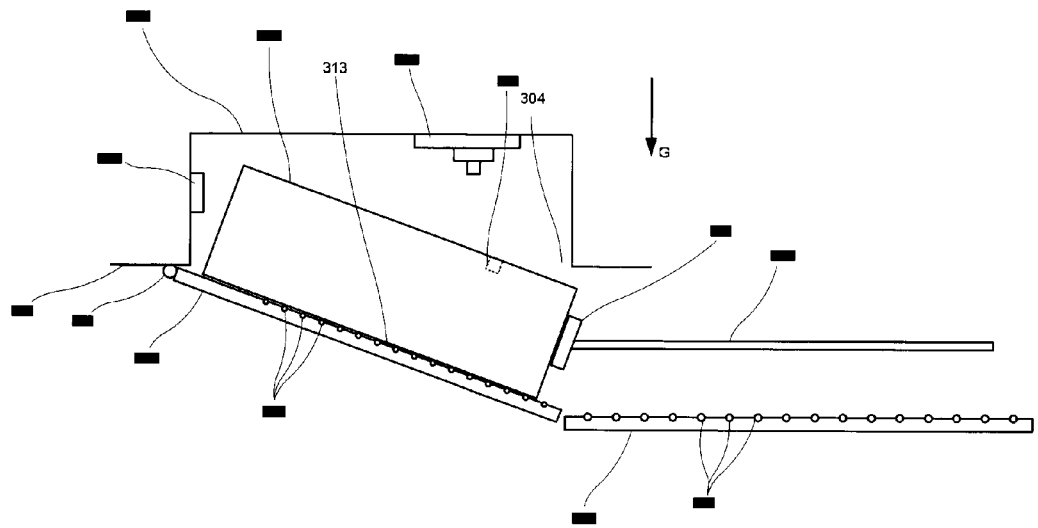

FIGS. 2a-2c show a storage space 200 in a vehicle, which storage space is similar to the space 150 above, in which an opening 204 in the space 200 leads out under the underside 201 of the vehicle, as described above. A hinged door 210, arranged to be opened downwards using a hinge 211, in the direction G of gravity, covers in its closed position the opening 204, preferably in a liquid-tight manner. When the door 210 is closed, it is hence arranged to encase the battery 220 in the storage space 200 in a position in which the battery 220 is installed for propulsion of the vehicle.

An electrical motor 206, which is conventional as such and which for reasons of clarity is only shown in FIGS. 2a and 2b, but which very well may be used in the embodiments illustrated in FIGS. 3a-4b, is arranged to control the opening angle of the door 210 and to apply sufficient pressing force to create electrical contact between the battery 220 and the space 200, see below. The motor 206 is preferably of screw type.

Furthermore, an upper support surface 213 of the door is arranged to at least partly support the battery 220 when the door is in its open position, but possibly also when the door is in its closed position.

According to a preferred embodiment, illustrated in FIGS. 2a-4b, the support surface 213 comprises a sliding surface, along which the battery 220 can slide in a direction which is parallel to the support surface 213. It is preferred that the sliding surface comprises a rolling- or ball bed, which in turn comprises a number of friction-decreasing devices 212 in the form of bearing-journalled rolls or the like. However, it is realized that the support surface 213 can also be arranged in alternative ways, as long as the friction between the underside of the battery 220 and the support surface 213 is sufficiently small so as to achieve the present purposes. Examples of other types of support surfaces 213 comprises smooth metal- and Teflon surfaces.

The battery 220 comprises a contact means 221, preferably of female type, which is arranged to engage with, and thereby achieve good electric contact with, the corresponding contact means 203 in the storage space 200, which preferably is of male type and arranged out of reach for a user of the vehicle when the door 210 is closed. In the embodiment illustrated in FIGS. 2a-2c, the contact means 203 is fixedly arranged on the door 210, and therefore rotatable in relation to the storage space 200, and is furthermore connected to the wall of the storage space 200 using a flexible cable 202. The two contact means 203, 221 are in the present embodiment arranged to engage with each other along a direction which is essentially parallel to the support surface 213.

When the battery 220 is to be removed from the space 200, the door 210 is opened by being partly folded downwards. The result is illustrated in FIG. 2b, from which it is also clear that the battery 220, which is at least partly supported by the support surface 213, during the folding down moves together with the door 210, and that the same is true regarding the contact means 203, which still is in engagement with the contact means 221.

Furthermore, in connection to the opening of the door 210, a part of the battery 220 becomes available for a first engagement device 240 of the first transport device 230. The engagement device 240, which comprises an exemplifying suction cup 241, engages with or supports the battery 220 and brings it along the support surface 213, in a direction which has a non-zero horizontal component, and in other words runs at least partly sideways, away from the storage space 200 and thereafter away from the vehicle along the path 121 described in connection to FIG. 1b. This takes place at least partly using a transport plane 230 comprising a roller bed 231 or the like, according to what has been described in SE 1050656 A1.

In connection herewith, it is preferred that the support surface 213 in the open position of the door 210 is inclined to such an extent so that the battery 220 only by the pull of gravity G can slide down along the gliding surface and up to a position where the first engagement device 240 can engage with or support the battery 220, after which the above described transport device can bring the battery 220 away from the vehicle.

In order for the battery 220 not to risk to slide down along the support surface 213 in an uncontrolled manner, a locking device can be arranged. In FIGS. 2a-2c, this locking device is exemplified by the engagement between the contact means 203, 221 being of a type similar to the mechanism in a bullet point pen, in which the bullet point is pushed outwards an inwards, respectively, and is locked in its position by consecutive pressings on a button on the opposite side in relation to the bullet point. In other words, the contact means 203, 221 engage with each other the first time they are pressed together in a direction which is parallel to the support surface 213, whereby the engagement at the next such pressing together is released, and so on. In order to release the engagement, the engagement device 240 is thus arranged to achieve a certain pressure against the battery 220, to the left in FIGS. 2a-2c, in order to release the battery 220 from its engagement with the contact means 203. Thereafter, the battery 220 can be brought down along the support surface 213, in a controlled manner, and away from the vehicle. However, it is realized that other types of locking devices can also be useful, such as a locking flange on the door 210 arranged to be deactivated either by the vehicle or by the engagement means 240, alternatively a locking shoulder on the support surface 213, over which the engagement means 240 is arranged to bring the battery 220. Alternatively, the engagement device 240 can be arranged to catch the battery 220 in connection to the opening of the door 210, whereby no special locking devices are required.

FIG. 2c illustrates the situation where the engagement between the contact means 203, 221 has been released, and the engagement device 240 has brought the battery 220 a certain distance in on the transport plane 230.

When a new, charged battery is then to be installed in the storage space 150, a reverse maneuver is performed. The second engagement device of the second transport device 140, described above, hence engages with or supports the new battery, and brings it in under the vehicle, along the above w described path 123, onwards to the door 210, which is then in an open position, and onwards to a position in which the battery at least partly is supported by the support surface 213 of the door 210. Then, the battery is brought, in a way which is opposite to the one described above in connection to FIGS. 2a-2c, along the support surface 213, in a direction which has a non-zero horizontal component, in towards the storage space 200 and onwards to a desired position, after which the door is closed, whereby the second battery is inserted completely into the storage space.

It is preferred that the transport device to this end is arranged to push the charged battery upwards along the support surface 213, and onwards to a position from which the battery is brought upwards and into the storage space 200 when the door 210 has been completely closed.

In FIGS. 2a-2c, this position is manifested in the position for the battery 220 illustrated in FIG. 2b, in which the contact means 203, 221 engage with each other. Hence, good electric contact is achieved between the battery 220 and the vehicle, via the storage device 200, by the transport device pushing the battery 220 along the support surface 213 on to a position in which respective contact means 203, 211 of the battery 220 and the vehicle, respectively, come into contact with each other, and thereafter pushing the battery 220 an additional distance in essentially the same direction, whereby sufficient electric contact is achieved by a male contact engaging with a corresponding female contact as a consequence of the motion of the battery 220 in relation to the storage space 200.

FIGS. 3a and 3b illustrate an alternative arrangement regarding the contact means on the battery 321 and in the storage space 303, respectively. Apart from this, FIGS. 3a and 3b are similar to FIGS. 2a and 2b, and share reference numerals for corresponding parts, even if the reference numerals in the FIGS. 3a-3b commence with the digit "3" instead of the digit "2", used in FIGS. 2a-2c.

As is clear from FIG. 3a, electric contact is thus achieved between the battery 320 and the vehicle by respective substantially vertically arranged contact means 321, 303 on the battery and on the vehicle, respectively, coming into good electric contact with each other when the battery 320 is supported by the support surface 313 and the door 310 is closed, so that the battery 320 is brought upwards, essentially parallel to and against the direction G of gravity, in the storage space 300.

FIG. 3b illustrates the situation when the door 310 has been opened, and the engagement device 340 engages with the battery 320. In this position, the engagement between the contact means 303, 321 has been released, which preferably takes place simply by the effect of gravity on the battery 320, but which can for instance also take place using a bullet point pen-like device according to the above described. In FIGS. 3*a* and 3*b*, a stopping device 305 is also shown, arranged to stop the motion of the battery 320 upwards along the support surface 321 at a position from which the battery 320 can be brought upwards, into the storage space 300, when a charged battery 320 is to be installed in the vehicle.

It is noted that in the embodiment shown in FIGS. 2*a*-2*c*, the electric contact is achieved using the substantially completely or partly horizontal motion of the engagement device 240, while it in FIGS. 3*a*-3*c* rather is achieved in a subsequent step, in connection to the closing motion of the door 310 in a completely or partly vertical direction.

Figure 4A:
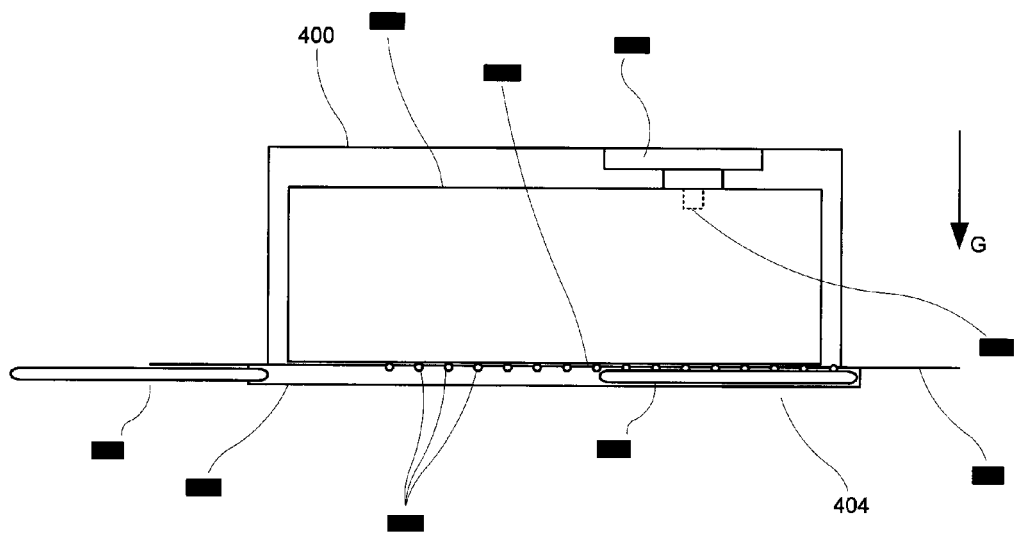
FIGS. 4a and 4b show two outline diagrams in cross-section of a battery which in two respective steps is brought out from a storage space in a vehicle.
Figure 4B:
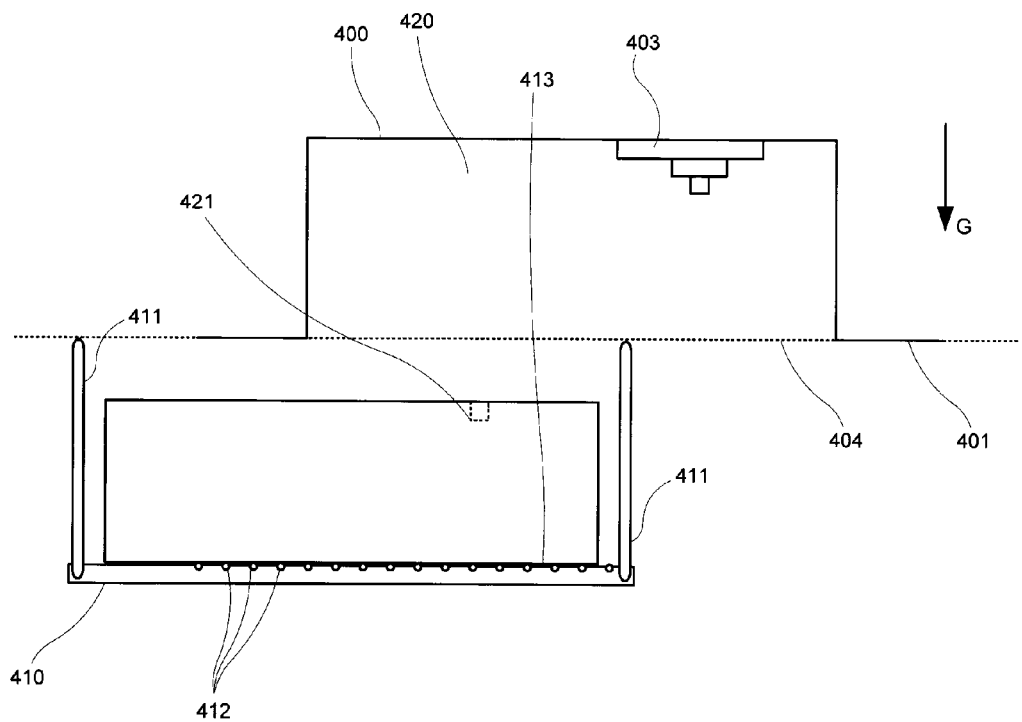

FIGS. 4*a* and 4*b*, which in a way corresponding to the FIGS. 3*a* and 3*b* correspond to the FIGS. 2*a* and 2*b*, and wherein the reference numerals are also the same but with different first digit, illustrate an alternative hinged suspension of the door 410.

In FIGS. 2*a*-3*b*, the door 210, 310 comprises a free end and a hinged end, where the free end can be folded down during opening of the door 210, 310, so that the support surface thereby becomes slanted.

In FIGS. 4*a* and 4*b*, on the other hand, the door 410 engages with the rest of the storage device 400 using a slewing bracket system comprising two slewing brackets 411 arranged to control the door 410 during opening. Thereby, the door 410, during opening, can be displaced downwards while the support surface is held substantially horizontal during the whole door opening process. Such a construction results in that the problem of catching the battery 420 is avoided, so that uncontrolled sliding across the support surface 413 does not occur.

Figure 5:
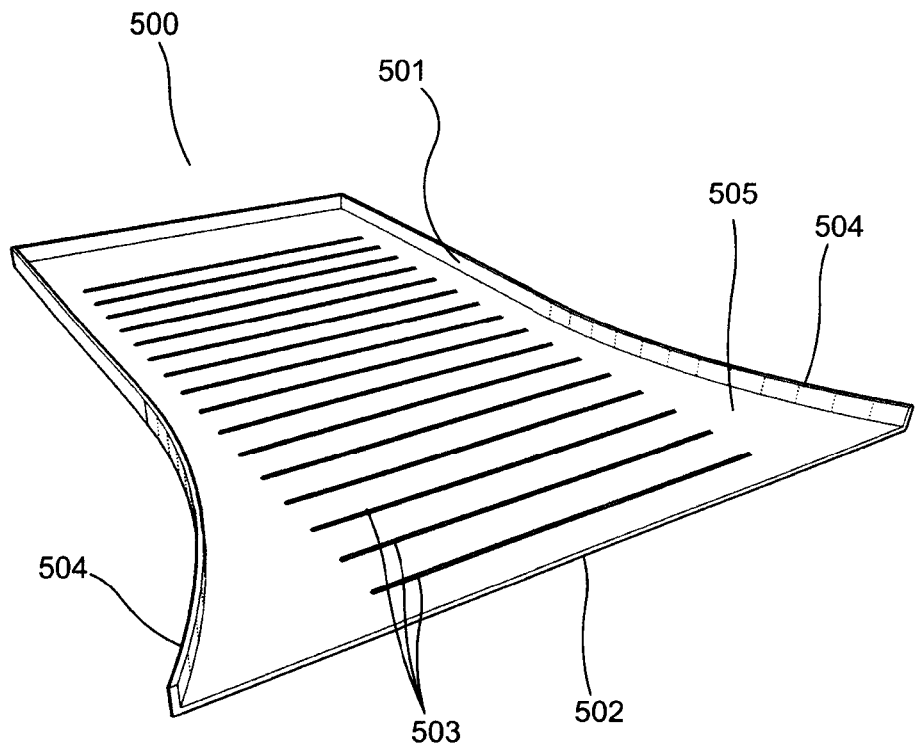
FIG. 5 shows a door to a storage space in a vehicle.

FIG. 5 illustrates in greater detail a preferred embodiment of the door 500. According to this embodiment, it comprises a rim 501 running at least partly around the edge of the door 500, preferably along the whole edge except at the end 502 which is arranged to receive and hand over a battery. At the end of the door 500 which is the opposite end 502, the rim can function as a stopping means similar to the means 305, above. The support surface 505 comprises rolling means 503 in the form of journalled rolls. At the end 502, the door 500 comprises broadened edges 504, arranged to control a battery into the correct position on the door 500 before the installation of the battery into the vehicle. This decreases the requirements for precision during the positioning of the vehicle and the position recognition of the transport device.

Figure 6:
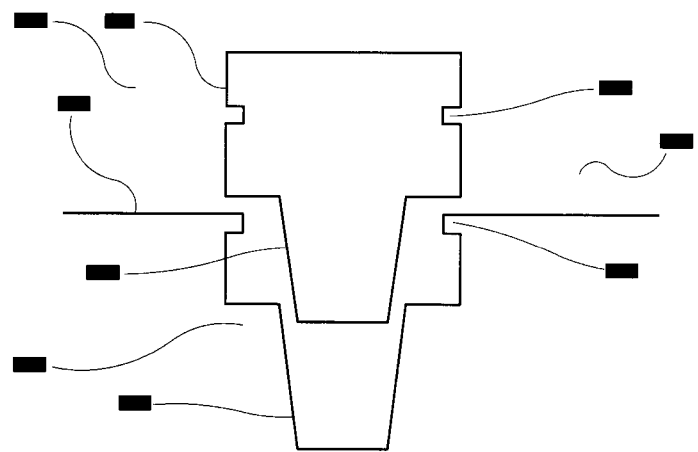
FIG. 6 is an outline diagram of a contact device for a battery.

FIG. 6 illustrates, in greater detail, a preferred embodiment of a contact device 600 for connection of a 620 battery to a vehicle, in the form of a female contact means 630 arranged in the battery 620 and arranged to engage with and thereby be electrically connected to a male contact means 610, arranged in the vehicle, preferably in the storage space. Schematically illustrated, cooperating engagement means 612, 633 in the form of a snap lock illustrates that the engagement may be arranged to retain the battery in a certain position in the storage space up until a time when a certain apart-pulling force is applied to the battery using the above described engagement means. Furthermore, the contact surfaces 613, 632, respectively, are themselves designed so that they are tapered towards the end and bottom, respectively, and preferably essentially cone-shaped. This results in an improved electric contact even in those cases in which the position of the battery 620 on the door for some reason should not be exact, when dirt is present on the contact surfaces and so on.

It is furthermore preferred that the contact means, the female one and/or the male one, are spring loaded, in order to increase the contact pressure between the contact means and to thereby achieve improved electric contact under various operation prerequisites.

Above, preferred embodiments have been described. However, it is apparent to the skilled person that many modifications can be made to the described embodiments without departing from the idea of the invention.

Hence, it is realized that the constructions of the storage space and the door illustrated in FIGS. 2*a*-4*b* are only examples, and that other types of such constructions can be used in order to achieve the purposes of the invention. For instance, the door and the battery may comprise cooperating guide tracks for leading the battery to a desired location, and the storage device can be arranged only partly raised above the bottom plate of the vehicle. Furthermore, a stopping means of the type illustrated in FIGS. 3*a*-3*b* can be used in combination with the embodiments illustrated in FIGS. 2*a*-2*c* and 4*a*-4*b*, respectively.

Hence, the invention shall not be limited by the described embodiments, but may be varied within the scope of the enclosed claims.

The invention claimed is:

1. Method for battery replacement in a vehicle (110), which vehicle is equipped with a storage space (150;200;300;400) for a battery (120,122;220;320;420;620), wherein an opening (151;204;304;404) into the storage space is arranged under the vehicle, wherein a battery installed in the storage space is arranged to be used to propel the vehicle, wherein the following steps are performed:
   a) the vehicle is caused to assume a first predetermined position in relation to a first transport device (130), arranged at least partly above ground (100) and beside the first predetermined position, for automatic transport of a first battery (120) out and away from the vehicle;
   b) the first transport device is caused to bring the first battery out and away from the vehicle along a first path (121) running from the storage space, under a side beam (112) of the vehicle and up to a position above ground and beside the vehicle;
   c) the vehicle is caused to assume a second predetermined position, which may be the same as the first predetermined position, in relation to a second transport device (140), which may be the same as the first transport device and which is arranged at least partly above ground and beside the second predetermined position, for automatic transport of a second battery (122) up to and into the vehicle; and
   d) the second transport device is caused to bring the second battery up to and into the vehicle along a second path (123) running from a position above ground and beside the vehicle, under a side beam of the vehicle and up to the storage space;

characterised in that, in step b), a hinged door (210;310;410; 510), arranged at the underside of the vehicle so that it in a closed position covers the opening, is opened downwards, whereby a part of the first battery, which in this position at least partly is supported by a support surface (213;313;413; 505) of the door, becomes available to an engagement device (240;340) of the first transport device (130), and in that the first engagement device thereafter in step b) engages with or supports the first battery and brings the first battery along the support surface of the door, in a direction with a non-zero horizontal component, away from the storage space and thereafter away from the vehicle along the said first path.

2. Method according to claim 1, characterised in that, in step b) and/or in step d), the respective battery (120,122;220; 320;420;620) is caused to slide along a sliding surface comprised in the support surface (213;313;413;505).

3. Method according to claim 2, characterised in that the sliding of the respective battery (120,122;220;320;420;620) is caused to be performed along a roller- or ball bed (212;312; 412;503).

4. Method according to claim 3, characterised in that the support surface (213;313) in the open position of the door (210;310) is caused to slant so much so that the first battery (220;320) merely by the pull of gravity (G) can slide downwards along the sliding surface (212;312) and on to a position in which the first engagement device (240;340) can engage with or support the first battery, after which the first transport device (130) can take the first battery away from the vehicle (110).

5. Method according to claim 3, characterised in that, in step d), a second engagement device (240;340) of the second transport device (140) engages with or supports the second battery (122;220;320;420), and brings it in under the vehicle (110) along the said path (123), up to the door (210;310;410; 500), which is in its open position, to a position where the second battery is at least partly supported by the support surface (213;313;413;505) of the door, and thereafter along the support surface, in a direction which has a non-zero horizontal component, in towards the storage space (150;200; 300;400) and up to a desired position, after which the door is closed, whereby the second battery is inserted completely into the storage space.

6. Method according to claim 3, characterised in that electric contact between the second battery (122;320;420) and the vehicle (110) is achieved by means of a respective essentially vertically arranged contact means (303,321;403,421;610;630) of the second battery and the vehicle, respectively, coming into good electric contact with each other when the second battery is supported by the support surface (313;413;505) and the door (310;410;500) is closed so that the second battery is brought upwards, into the storage space (150;300;400).

7. Method according to claim 2, characterised in that the support surface (213;313) in the open position of the door (210;310) is caused to slant so much so that the first battery (220;320) merely by the pull of gravity (G) can slide downwards along the sliding surface (212;312) and on to a position in which the first engagement device (240;340) can engage with or support the first battery, after which the first transport device (130) can take the first battery away from the vehicle (110).

8. Method according to claim 7 characterised in that, in step d), a second engagement device (240;340) of the second transport device (140) engages with or supports the second battery (122;220;320;420), and brings it in under the vehicle (110) along the said path (123), up to the door (210;310;410; 500), which is in its open position, to a position where the second battery is at least partly supported by the support surface (213;313;413;505) of the door, and thereafter along the support surface, in a direction which has a non-zero horizontal component, in towards the storage space (150;200; 300;400) and up to a desired position, after which the door is closed, whereby the second battery is inserted completely into the storage space.

9. Method according to claim 7, characterised in that electric contact between the second battery (122;320;420) and the vehicle (110) is achieved by means of a respective essentially vertically arranged contact means (303,321;403,421;610;630) of the second battery and the vehicle, respectively, coming into good electric contact with each other when the second battery is supported by the support surface (313;413;505) and the door (310;410;500) is closed so that the second battery is brought upwards, into the storage space (150;300;400).

10. Method according to claim 2, characterised in that, in step d), a second engagement device (240;340) of the second transport device (140) engages with or supports the second battery (122;220;320;420), and brings it in under the vehicle (110) along the said path (123), up to the door (210;310;410; 500), which is in its open position, to a position where the second battery is at least partly supported by the support surface (213;313;413;505) of the door, and thereafter along the support surface, in a direction which has a non-zero horizontal component, in towards the storage space (150;200; 300;400) and up to a desired position, after which the door is closed, whereby the second battery is inserted completely into the storage space.

11. Method according to claim 10, characterised in that the second transport device (140) pushes the second battery (122; 220;320;420) upwards along the support surface (213;313; 413;505) of the door (210;310;410;500) up to a position from which the second battery is brought upwards and into the storage space (150;200;300;400) when the door is completely closed.

12. Method according to claim 11, characterised in that electric contact between the second battery (122;220;320; 420) and the vehicle (110) is achieved by means of the second transport device (140) pushing the second battery along the support surface (213;313;413;505) up to a position in which respective contact means (203,221;610,630) of the second battery and the vehicle, respectively, come into contact with each other, and thereafter pushes the second battery an additional distance in substantially the same direction, whereby adequate electric contact is achieved by a male contact (613) engaging with a corresponding female contact (632) as a consequence of the motion of the second battery in relation to the storage space (150;200).

13. Method according to claim 2, characterised in that electric contact between the second battery (122;320;420) and the vehicle (110) is achieved by means of a respective essentially vertically arranged contact means (303,321;403, 421;610;630) of the second battery and the vehicle, respectively, coming into good electric contact with each other when the second battery is supported by the support surface (313; 413;505) and the door (310;410;500) is closed so that the second battery is brought upwards, into the storage space (150;300;400).

14. Method according to claim 1, characterised in that the storage space (150;200;300;400) in an initial step is achieved by a space, which is closed everywhere but at the said opening (151;204;304;404), is arranged in the underside of the vehicle (110), so that the opening is arranged essentially in line with the underside of the vehicle and at a distance from all side beams (112) of the vehicle.

15. Device (130;140) for automatic battery replacement in a vehicle (110) equipped with a storage space (150;200;300; 400) for a battery (120,122;220;320;420), wherein an opening (151;204;304;404) to the storage space is arranged under the vehicle, and wherein a battery installed in the storage space is arranged to be used to propel the vehicle, which device is arranged to, after the vehicle has assumed a first predetermined position in relation to the device, bring a first battery out and away from the vehicle, and to, after the vehicle has assumed a second predetermined position in relation to the device, which may be the same as the first predetermined position, bring a second battery up to and into the vehicle, whereby the device is arranged to be installed at least partly above ground (100) and beside the first and second, respectively, predetermined position, and in that the device is arranged to bring the first and second batteries away from and up to, respectively, the vehicle along a respective path (121, 123) which runs from the storage space, under a side beam (112) of the vehicle and up to a respective position above ground and beside the vehicle, characterised in that a first engagement device (240;340) of the device is arranged to, after a hinged door (210;310;410;500), arranged at the underside of the vehicle and to be opened downwards and in a closed position cover the said opening, has been opened, and a part of the first battery (120;220;320;420), which in this position of the door at least partly is supported from below of a support surface (213;313;413;505) of the door, to engage with or support the first battery and to bring the first battery along the support surface of the door in a direction with a non-zero horizontal component, away from the storage space and thereafter away from the vehicle along said path.

16. Device (130;140) according to claim 15, characterised in that a second engagement device (240;340) of the automatic battery replacement device is arranged to engage with or support the second battery (122;220;320;420), and to bring it in under the vehicle (110), along the said path (123), up to the door (210;310;410;500), which is then in an open position, to a position in which the second battery is supported by the support surface (213;313;413;505) of the door, and thereafter along the support surface, in a direction which has a non-zero horizontal component, inwards towards the storage space (150;200;300;400) and on to a desired position from which the second battery can be inserted completely into the storage space when the door is closed.

17. Storage device for use in a vehicle (110) arranged to receive and accommodate a battery (120,122;220;320;420), which when installed in a storage space (150;200;300;400) comprised in the storage device is arranged to be used for propulsion of the vehicle, where the storage device comprises an opening (151;204;304;404) into the storage space under the vehicle, characterised in that the storage device comprises a hinged door (210;310;410;500) which is arranged at the underside of the vehicle, in that the door is arranged to be opened downwards and to in a closed position cover the said opening, and in that an upper support surface (213;313;413; 505) of the door is arranged to at least partly and slidably support the battery when the door is in an open position.

18. Storage device according to claim 17, characterised in that the support surface (213;313;413;505) comprises a sliding surface (212;312;412;503) along which the battery (120; 122;220;320;420) can slide.

19. Storage device according to claim 18, characterised in that the door (210;310;500) has a free end (502) and a hinged end, whereby the free end can be folded downwards when opening the door so that the support surface (213;313;505) as a consequence thereof becomes slanted.

20. Storage device according to claim 18, characterised in that the door (410;500) engages with the remaining parts of the storage device via a slewing bracket system (411) so that the door, when opening the door, can be displaced downwards while the supporting surface (413;505) is held essentially horizontal during the whole process of opening the door.

* * * * *